March 18, 1941.  W. E. RUSSELL  2,234,983
RODENT TRAP
Filed March 25, 1940
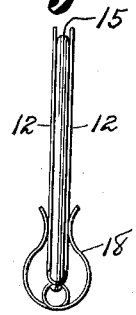
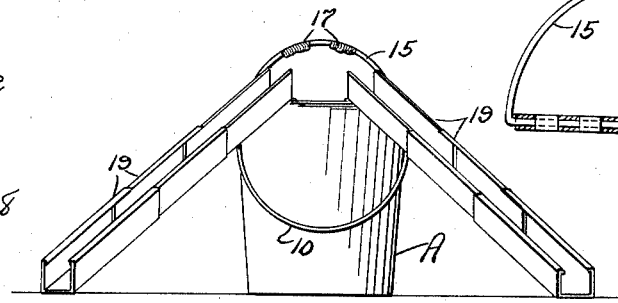
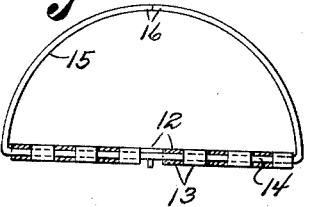
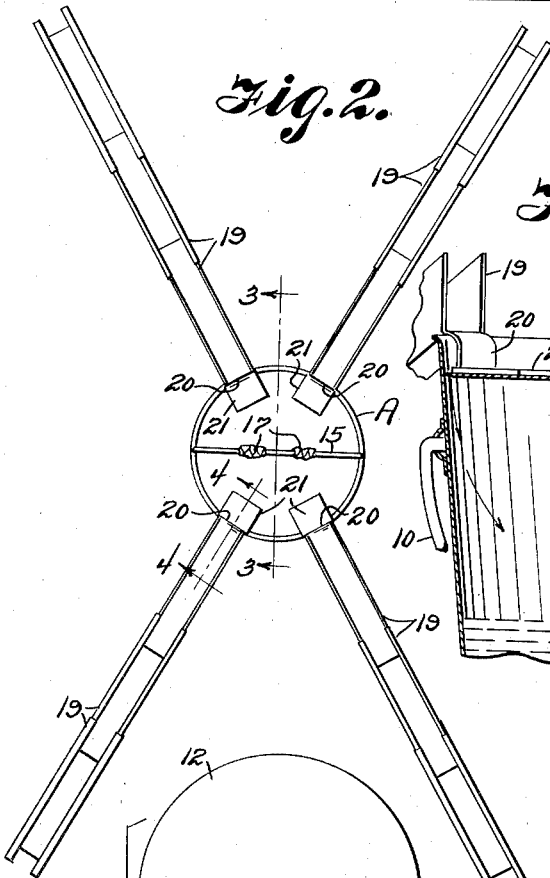
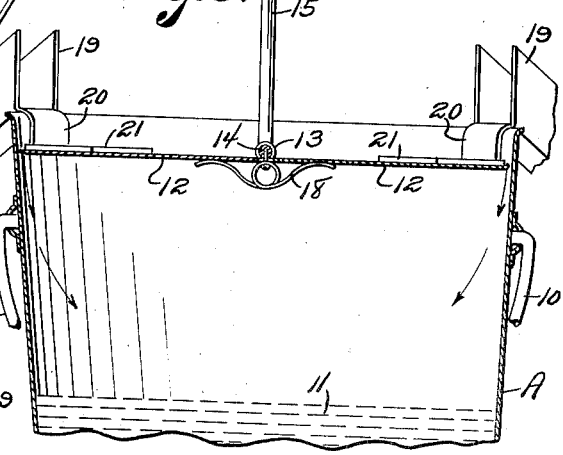
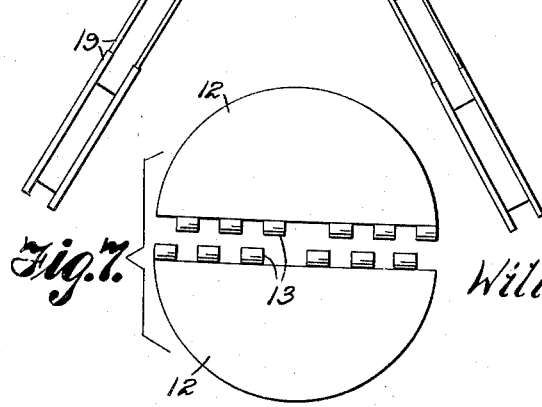
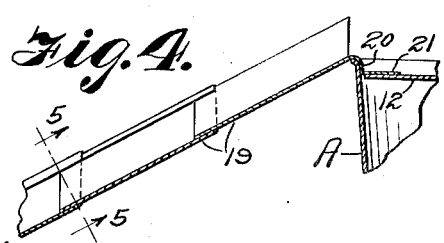
William E. Russell INVENTOR
BY Victor J. Evans & Co.
ATTORNEYS Patented Mar. 18, 1941

2,234,983

UNITED STATES PATENT OFFICE 2,234,983

RODENT TRAP

William E. Russell, Cumberland, Md.

Application March 25, 1940, Serial No. 325,865

4 Claims. (Cl. 43—69)

The invention relates to a trap and more especially to a rodent trap or exterminator.

The primary object of the invention is the provision of a device of this character wherein through the use of a bucket or other liquid container and a trapping lid or cover therefor rodents can be caught, the liquid in the bucket or the like being adapted to drown such rodents trapped and in this manner exterminating the pests.

Another object of the invention is the provision of a device of this character wherein a plurality of extensible leads are adapted for association with a liquid container such as a bucket or the like so that rats, mice or other animals can be assured of access to the receptacle, bucket or the like whereby on reaching the open top through a trap cover or lid they will be caused to fall within the receptacle, bucket or the like and in this way drowned.

Another object of the invention is the provision of a device of this character wherein the use of an ordinary garbage pail, bucket or the like may be resorted to so as to enable the trapping and drowning of rodents, they having access thereto, and will be trapped therein.

A still further object of the invention is the provision of a device of this character, which is simple in its construction, thoroughly reliable and effective in operation, novel in its entirety, readily portable, easily and conveniently set up for use, capable of being packed and shipped, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claims hereunto appended.

In the accompanying drawing:

Figure 1 is an elevation of the device constructed in accordance with the invention and in position for use.

Figure 2 is a top plan view thereof.

Figure 3 is a fragmentary enlarged sectional view taken on the line 3—3 of Figure 2 looking in the direction of the arrows.

Figure 4 is an enlarged fragmentary sectional view taken on the line 4—4 of Figure 2 looking in the direction of the arrows.

Figure 5 is a sectional view taken on the line 5—5 of Figure 4 looking in the direction of the arrows.

Figure 6 is an elevation partly in section of the bait holder or carrier.

Figure 7 is an exploded plan view of the trapping lid or cover of the device.

Figure 8 is an end elevation of the lid or cover in a normal position.

Similar reference characters indicate corresponding parts throughout the several views in the drawing.

Referring to the drawing in detail, A designates generally a pail, bucket or the like, preferably of that type used for garbage purposes, and has an open top while attached at diametrically opposite points of the body of said pail, bucket or the like is a swingable bail handle 10, being conventional for the handling of the said pail, bucket or the like when transported from one locality to another by hand. This pail, bucket or the like A is adapted to contain a quantity of water or other liquid 11 and the same is of a quantity to reach a level considerably below the edge of the open top so that rodents dropping into this water will become drowned without liability of escape therefrom.

Arranged within the open top of the body of the receptacle A is a trapping lid or cover involving two semi-circular-shaped sections or doors 12, these at the straight sides thereof being formed with pintle sleeves 13 for a pintle portion 14 shaped from a wire bait holder or frame 15 formed from a single length of wire, the pintle portion 14 being created intermediate of the ends of said wire, while the ends 16 of such wire are brought together at a point elevated with respect to the set position of the sections or doors 12 when within the open top of the body of the pail, bucket or the like. The bait holder is upwardly arched, and adapted to be wired or otherwise fastened thereto is bait 17.

Joined with the pintle portion 14 intermediately with respect to the sections or doors 12 is a double-acting leaf spring 18 which makes contact with both sections or doors 12 and under the weight of a load will permit the dropping of these sections or doors when the latter are in a closing position within the open top of the pail, bucket or the like A and thus function as trap doors. The spring 18 returns the sections or doors 12 to closing position when relieved of the load of a rodent thereon.

The pintle and bait holder 14 and 15, which are unitary, enable the frictional engagement of the sections or doors 12 in the open top of the pail, bucket or the like A and results in no interference between these sections or doors and the body of the pail, bucket or the like so that said doors may operate for trapping action.

Adapted to be arranged with the pail, bucket or the like A is a series of sloping, extensible treadways, each constituted by a plurality of interfitted slidably connected members 19 and in their joined relationship form a troughlike gangway. One end of each gangway is formed with a hooklike extension 20 having an abutment 21, the extension being adapted to saddle the edge of the open top of the pail, bucket or the like as is clearly shown in Figures 3 and 4 of the drawing. The abutment 21 is adapted to have contact with a section or door 12 next thereto in the manner as shown in Figure 3 of the drawing so that rodents following the gangways created by the members 19 can reach the open top of the pail, bucket or the like and also pass onto the doors or sections 12, which under their weight will drop and thus deposit the rodents into the pail, bucket or the like so that the water or other liquid 11 will effect the drowning of such rodents and in this way exterminate the same.

The ends of the gangways remote from the extensions 20 in their sloping relationship to the pail, bucket or the like can rest upon a foundation supporting the pail, bucket or the like so that rodents can freely gain access thereto and are enabled to reach the open top of the pail, bucket or the like which results in the trapping thereof.

The bait 17 can be of any selected character best suitable for the purposes intended thereof.

A pail, bucket or the like can be emptied of drowned rodents in an easy and convenient manner, this being effected by a slight upward pull upon the treadways, laying them aside in their entirety, without removing any of the joined parts. Then with one hand holding the handle and the other placed on the outside bottom of the container the latter can be tilted for the pouring out therefrom of rodents, et cetera, from either one of the doors since the spring, being unattached, allows free upward movement of such doors after the treadways are removed.

Now it is easy to refill the container with water or any other liquid by lifting up one door. The bait is not disturbed either by emptying or refilling. For further use, simply replace the treadways in their former position.

From the foregoing it is thought that the construction and manner of operation of the device will be clearly understood and therefore a more extended explanation has been omitted.

What is claimed is:

1. A rodent trap for a pail having an open upper end with the body downwardly tapered, comprising a pair of hingedly connected door sections swingable on a common axis for the opening and closing of the upper open end of said pail, a bait holder having a portion forming a pivot for said door sections and also a portion arched upwardly above the same, and treadways resting upon the pail at the open top and outwardly inclined from the latter for contact with a support or foundation and having extensions arranged for overhanging the door sections and forming stops for limiting the swing thereof in one direction.

2. A rodent trap for a pail having an open upper end with the body downwardly tapered, comprising a pair of hingedly connected door sections swingable on a common axis for the open and closing of the upper open end of said pail, a bait holder having a portion forming a pivot for said door sections and also a portion arched upwardly above the same, and extensible treadways resting upon the pail at the open top and outwardly inclined from the latter for contact with a support or foundation and having extensions arranged for overhanging the door sections and forming stops for limiting the swing thereof in one direction.

3. A rodent trap for a pail having an open upper end with the body downwardly tapered, comprising a pair of hingedly connected door sections swingable on a common axis for the opening and closing of the upper open end of said pail, a bait holder having a portion forming a pivot for said door sections and also a portion arched upwardly above the same, extensible treadways resting upon the pail at the open top and outwardly inclined from the latter for contact with a support or foundation and having extensions arranged for overhanging the door sections and forming stops for limiting the swing thereof in one direction, and means active upon the door sections for tensioning and holding the same against the stops for the normal closing of the upper open end of the pail.

4. A rodent trap for a pail having an open upper end with the body downwardly tapered, comprising a pair of hingedly connected door sections swingable on a common axis for the opening and closing of the upper open end of said pail, a bait holder having a portion forming a pivot for said door sections and also a portion arched upwardly above the same, extensible treadways resting upon the pail at the open top and outwardly inclined from the latter for contact with a support or foundation and having extensions arranged for overhanging the door sections and forming stops for limiting the swing thereof in one direction, means active upon the door sections for tensioning and holding the same against the stops for the normal closing of the upper open end of the pail, and hooklike formations in the said extensions for saddling the edge of the open top of said pail, the said upwardly arched portion of the bait holder being disposed vertically to the horizontal plane of the door sections when in normal closing position.

WILLIAM E. RUSSELL.